(12) United States Patent
Guha et al.

(10) Patent No.: US 10,776,732 B2
(45) Date of Patent: Sep. 15, 2020

(54) DYNAMIC MULTI-FACTOR RANKING FOR TASK PRIORITIZATION

(71) Applicant: ServiceNow, Inc., Santa Clara, CA (US)

(72) Inventors: Rahul Guha, San Jose, CA (US); Venkitesh Subramanian, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 189 days.

(21) Appl. No.: 15/717,316

(22) Filed: Sep. 27, 2017

(65) Prior Publication Data
US 2018/0322430 A1    Nov. 8, 2018

Related U.S. Application Data

(60) Provisional application No. 62/501,657, filed on May 4, 2017.

(51) Int. Cl.
| | |
|---|---|
| *G06Q 10/06* | (2012.01) |
| *G06Q 30/00* | (2012.01) |
| *G06F 9/455* | (2018.01) |
| *H04L 12/24* | (2006.01) |
| *H04L 29/08* | (2006.01) |

(52) U.S. Cl.
CPC ..... *G06Q 10/06316* (2013.01); *G06Q 30/016* (2013.01); *H04L 41/5074* (2013.01); *G06F 9/45558* (2013.01); *G06F 2009/45595* (2013.01); *H04L 41/50* (2013.01); *H04L 67/10* (2013.01)

(58) Field of Classification Search
CPC ............ G06Q 10/06316; G06Q 30/016; H04L 41/5074; H04L 41/50; H04L 67/10; G06F 9/45558; G06F 2009/45595
See application file for complete search history.

(56) References Cited

U.S. PATENT DOCUMENTS

| | | |
|---|---|---|
| 6,609,122 B1 | 8/2003 | Ensor |
| 7,028,301 B2 | 4/2006 | Ding |

(Continued)

OTHER PUBLICATIONS

"Stock Ranking and Portfolio Selection: Revising and Developing Z-scores," Daniel Scinto, Jo Hardin, Pomona College, Apr. 3, 2009.

*Primary Examiner* — Sujay Koneru
(74) *Attorney, Agent, or Firm* — Fletcher Yoder PC

(57) ABSTRACT

A computing system and method dynamic multi-factor ranking for prioritizing tasks, and in particular, tasks relating to servicing of problem reports in a managed network, is disclosed. The computing system may be disposed within a remote network management platform and be configured for management of problem report sent from reporting stations in the managed network. The computing system may thus receive a plurality of problem report messages from one or more reporting stations, and may then compute a multi-factor ranking of the messages based on dynamically selected factors associated with each message. The multi-factor ranking may then form the basis of a prioritized list of the messages, and the prioritized list may be displayed on a display device of the computing system. The prioritized list may thus provide a basis for prioritizing tasks related to servicing the reported problems.

17 Claims, 11 Drawing Sheets

(56) References Cited

U.S. PATENT DOCUMENTS

| | | |
|---|---|---|
| 7,062,683 B2 | 6/2006 | Warpenburg |
| 7,131,037 B1 | 10/2006 | LeFaive |
| 7,251,584 B1* | 7/2007 | Perazolo .............. G06F 11/008 |
| | | 702/182 |
| 7,170,864 B2 | 10/2007 | Matharu |
| 7,287,193 B2* | 10/2007 | Ward ................ H04L 41/0631 |
| | | 370/216 |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,124,957 B1* | 9/2015 | Fogel ............... H04M 15/8044 |
| 9,239,857 B2 | 1/2016 | Trinon |
| 9,535,737 B2 | 1/2017 | Joy |
| 9,557,969 B2 | 1/2017 | Sharma |
| 9,792,387 B2 | 10/2017 | George |
| 9,798,607 B1* | 10/2017 | Kulkarni ............. G06F 11/0778 |
| 2002/0184131 A1* | 12/2002 | Gatto .................... G06Q 40/00 |
| | | 705/36 R |
| 2009/0132876 A1* | 5/2009 | Freking ................ G06F 11/106 |
| | | 714/723 |
| 2009/0190747 A1* | 7/2009 | Spottiswoode ..... H04M 3/5232 |
| | | 379/265.12 |
| 2011/0246379 A1* | 10/2011 | Maddox ................ G06Q 40/06 |
| | | 705/310 |
| 2013/0031414 A1* | 1/2013 | Dhuse ................ G06F 11/0727 |
| | | 714/37 |
| 2013/0110590 A1* | 5/2013 | Folk ....................... G06Q 10/06 |
| | | 705/7.42 |
| 2013/0262320 A1* | 10/2013 | Makanawala ........... H04L 51/32 |
| | | 705/304 |
| 2015/0269587 A1* | 9/2015 | Swaminathan ...... G06Q 30/016 |
| | | 705/304 |
| 2016/0170686 A1* | 6/2016 | Haas .................... G06F 3/1229 |
| | | 358/1.14 |
| 2017/0024240 A1* | 1/2017 | Black .................... G06F 3/0608 |
| 2017/0178145 A1* | 6/2017 | Adrian ............... G06F 16/9535 |
| 2017/0308903 A1* | 10/2017 | Agranonik ........... G06Q 30/016 |
| 2018/0005246 A1* | 1/2018 | Basam ................ G06F 11/0709 |
| 2018/0108022 A1* | 4/2018 | Bandera ............. G06Q 30/016 |
| 2018/0322430 A1* | 11/2018 | Guha ............... G06Q 10/06316 |

\* cited by examiner

DYNAMIC MULTI-FACTOR RANKING FOR TASK PRIORITIZATION

CROSS-REFERENCE TO RELATED APPLICATIONS

This application claims priority under 35 U.S.C. § 119(e) to U.S. Provisional Patent Application Ser. No. 62/501,657, filed on May 4, 2017, which is incorporated herein in its entirety by reference.

BACKGROUND

In an enterprise network, customer support personnel may be responsible for fielding problem reports and undertaking actions to resolve reported problems. As an enterprise grows and employs more and remotely managed networks that include more and more devices and services, management of reported problems can become challenging. The potential volume and complexity of problems may call for an organized system for managing reported problems and customer (end user) expectations.

SUMMARY

It is now common for enterprise networks to include tens of thousands of devices across dozens of networks, supporting thousands of users. Enterprise networks may be deployed as remotely managed networks, in which many aspects of the actual underlying network architecture, as well as network operations, are managed offsite by a third party. One of the operational missions of remote network management is customer support for the users of the system working at end-user stations (devices) in the network. In particular, customer support may entail support personnel fielding problems reported by end users, and undertaking actions to get the problems resolved. Advantageously, techniques and systems described herein enable intelligent and flexible prioritization of problem reports that allow customer support management (CSM) personnel to optimally plan their problem-response activities and efficiently work towards resolutions.

The inventors have determined that the task of prioritizing problem reports for optimal ordering of servicing is complicated in a large network, at least because numerous, and sometimes changing, factors need to be accounted for when considering the servicing order. Non-limiting examples of factors for any given problem may include the nature and severity of the reported problem, who is reporting the problem, consequences or impact of the reported problem, and how long the reported problem has existed. Further, when considering numerous problems, the particular mix and relative importance of these factors may be different at different times or may depend, at least in part, on various other circumstances. Accordingly, the inventors have recognized the potential for prioritizing problem reports using an approach involving multi-factor ranking.

The inventors have further recognized that while techniques for multi-factor ranking have been used in the areas such as financial planning and services, these contexts bear little resemblance to the dynamic environment of remote network management. For example, the application of multi-factor ranking in financial planning and services is typically used to rank investment instruments, such as stocks and/or bonds. To this end, models have been developed that rely on analysis of long term trends of factors that otherwise play fixed and well-defined roles in the models. As such, models may be tuned by the statistics of the factors, but the list of factors used remains static within a given model. In contrast, for prioritizing problem reports in a remotely managed network, the mix of factors and their relative importance can change with time and circumstances and even the judgement of CSM personnel. Thus, the inventors have devised a dynamic multi-factor ranking approach to, among other advantages, solve the shortcomings of conventional multi-factor ranking. Example embodiments of dynamic multi-factor ranking of problem reports are provided herein.

Accordingly, a first example embodiment may involve a computing system disposed within a remote network management platform and configured to support a managed network, the computing system comprising: a display device; one or more processors; memory; and program instructions, stored in the memory, that upon execution by the one or more processors cause the computing system to perform operations including: receiving a plurality of problem report messages from one or more reporting stations in the managed network, wherein each problem report message of the plurality is indicative of user input for reporting a problem at a given one of the one or more reporting stations, and wherein each problem report message of the plurality has a multiplicity of attributes; computing a multi-factor ranking of the problem report messages of the plurality based on the same two or more attributes of each of the problem report messages of the plurality; generating a priority order of the plurality of problem report messages based on the computed multi-factor ranking, wherein the priority order determines an order for servicing problems reported in the problem report messages; and displaying the plurality of problem report messages in the priority order on the display device.

A second example embodiment may involve computing system disposed within a remote network management platform and configured to support a managed network, the computing system comprising: a display device; one or more processors; memory; and program instructions, stored in the memory, that upon execution by the one or more processors cause the computing system to perform operations including: receiving a plurality of problem report messages from one or more reporting stations in the managed network, wherein each problem report message of the plurality is indicative of user input for reporting a problem at a given one of the one or more reporting stations, and wherein each problem report message of the plurality has a multiplicity of attributes; dynamically selecting two or more attributes of the multiplicity shared in common by the plurality of problem report messages; computing a multi-factor ranking of the problem report messages of the plurality based on values of the selected two or more attributes specific to each of the problem report messages of the plurality; generating a priority order of the plurality of problem report messages based on the computed multi-factor ranking, wherein the priority order determines an order for servicing problems reported in the problem report messages; and displaying the plurality of problem report messages in the priority order on the display device.

A third example embodiment may involve a computer-implemented method carried out by a computing system disposed within a remote network management platform and configured to support a managed network, the method comprising: receiving by the computing system a plurality of problem report messages from one or more reporting stations in the managed network, wherein each problem report message of the plurality is indicative of user input for reporting a problem at a given one of the one or more reporting stations, and wherein each problem report message of the plurality has a multiplicity of attributes; computing a multi-factor ranking of the problem report messages of the plurality based on the same two or more attributes of each of the problem report messages of the plurality; generating a priority order of the plurality of problem report messages based on the computed multi-factor ranking, wherein the priority order determines an order for servicing problems reported in the problem report messages; and displaying the plurality of problem report messages in the priority order on a display device of the computing system.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
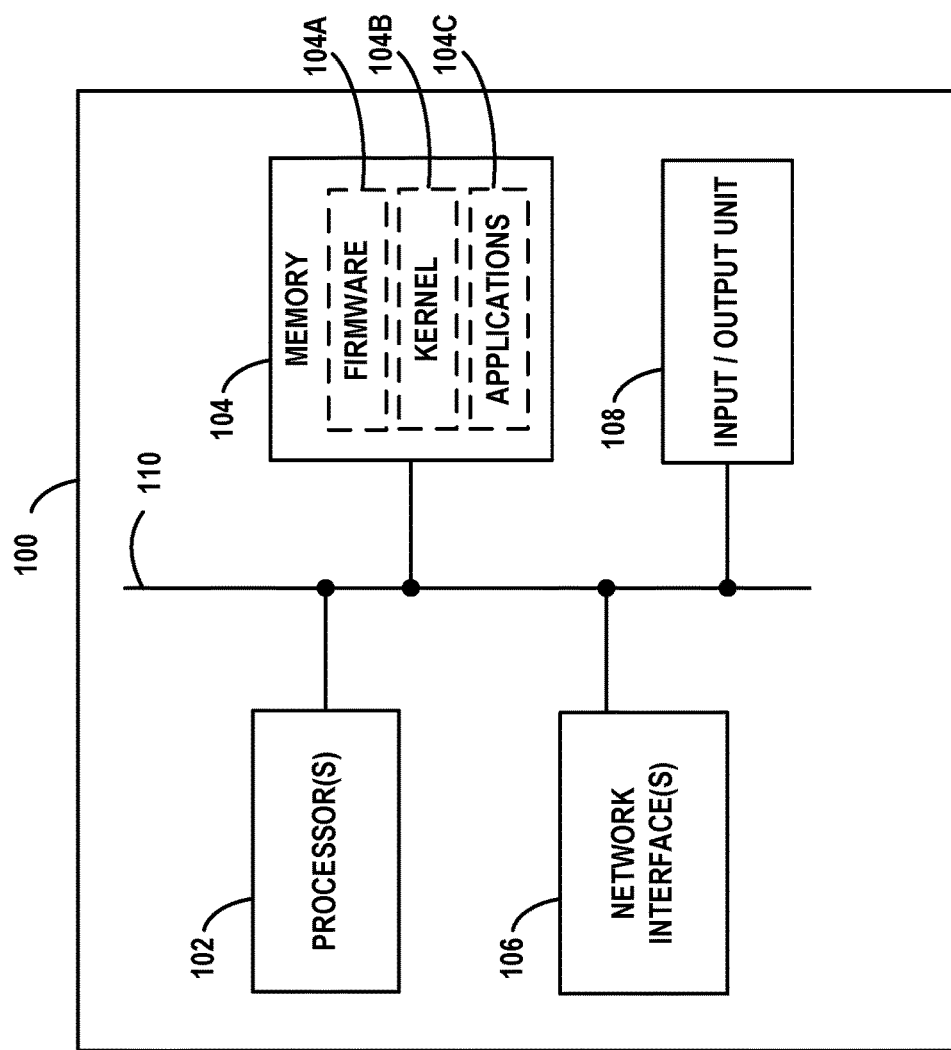
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
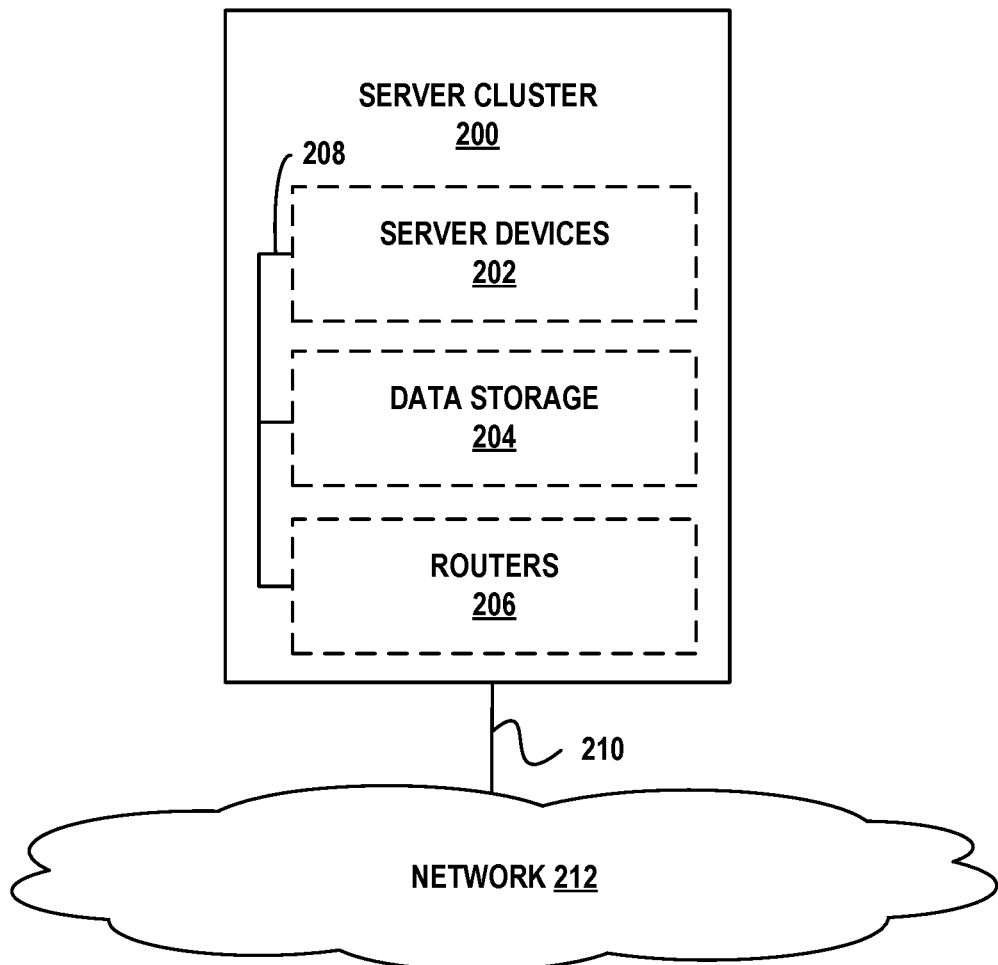
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
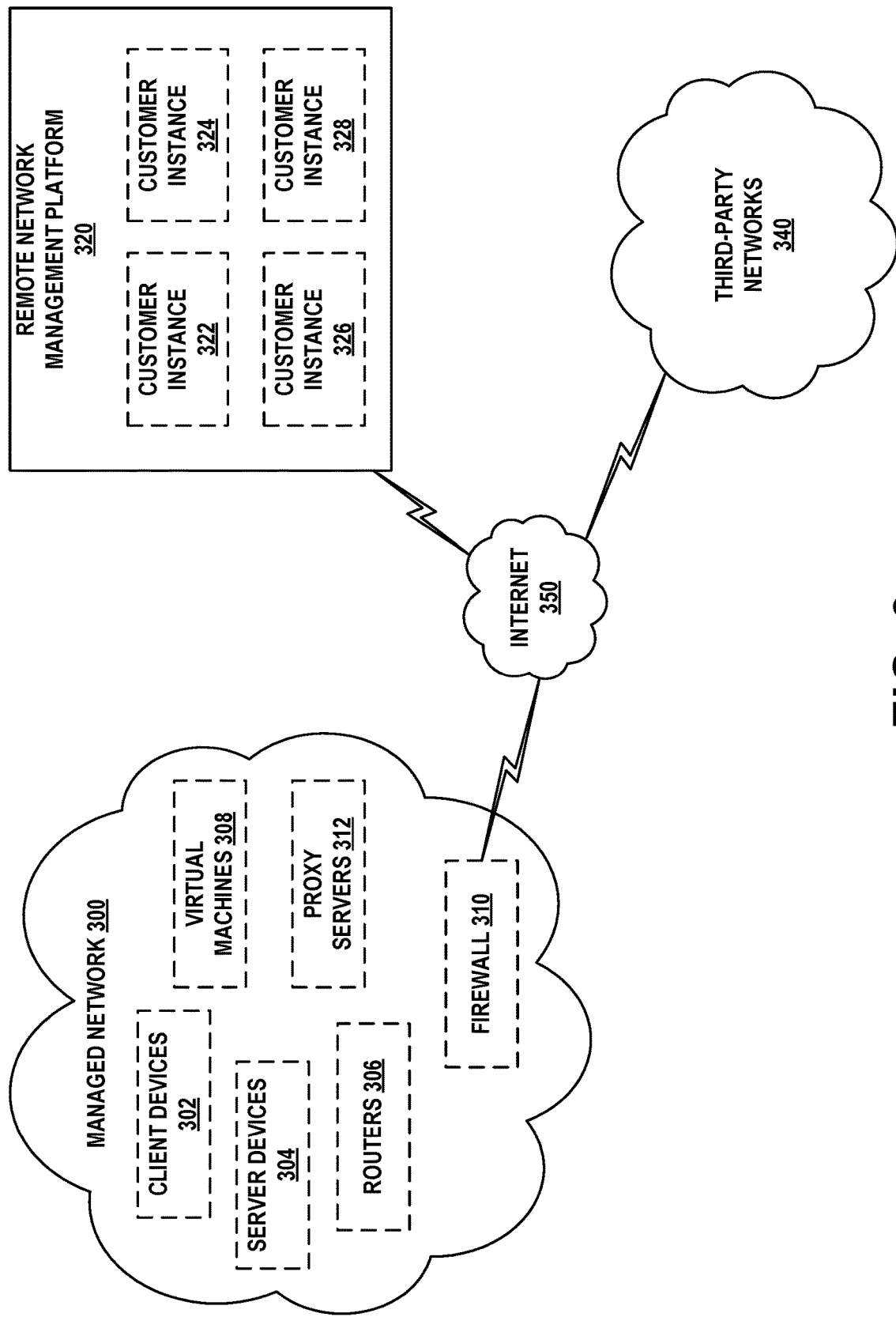
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices and services therein, while allowing authorized communication that is initiated from managed network 300. Firewall 310 may also provide intrusion detection, web filtering, virus scanning, application-layer gateways, and other services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
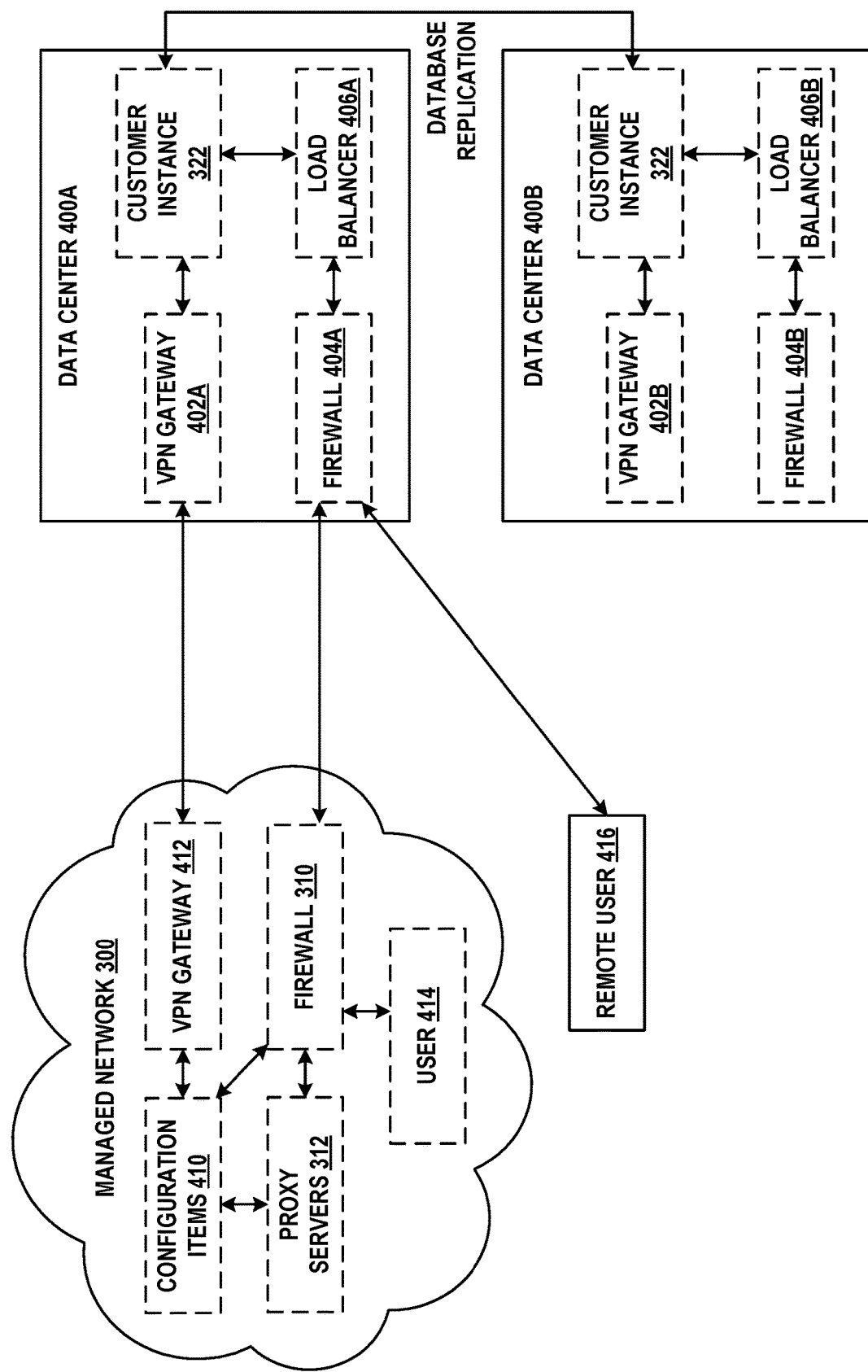
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications, programs, or services executing thereon, as well as relationships between devices and services. Thus, the term "configuration items" may be shorthand for any physical or virtual device or service remotely discoverable or managed by customer instance 322, or relationships between discovered devices and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE AND SERVICE DISCOVERY

In order for remote network management platform 320 to administer the devices and services of managed network 300, remote network management platform 320 may first determine what devices are present in managed network 300, the configurations and operational scorees of these devices, and the services provided by the devices, and well as the relationships between discovered devices and services. As noted above, each device, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
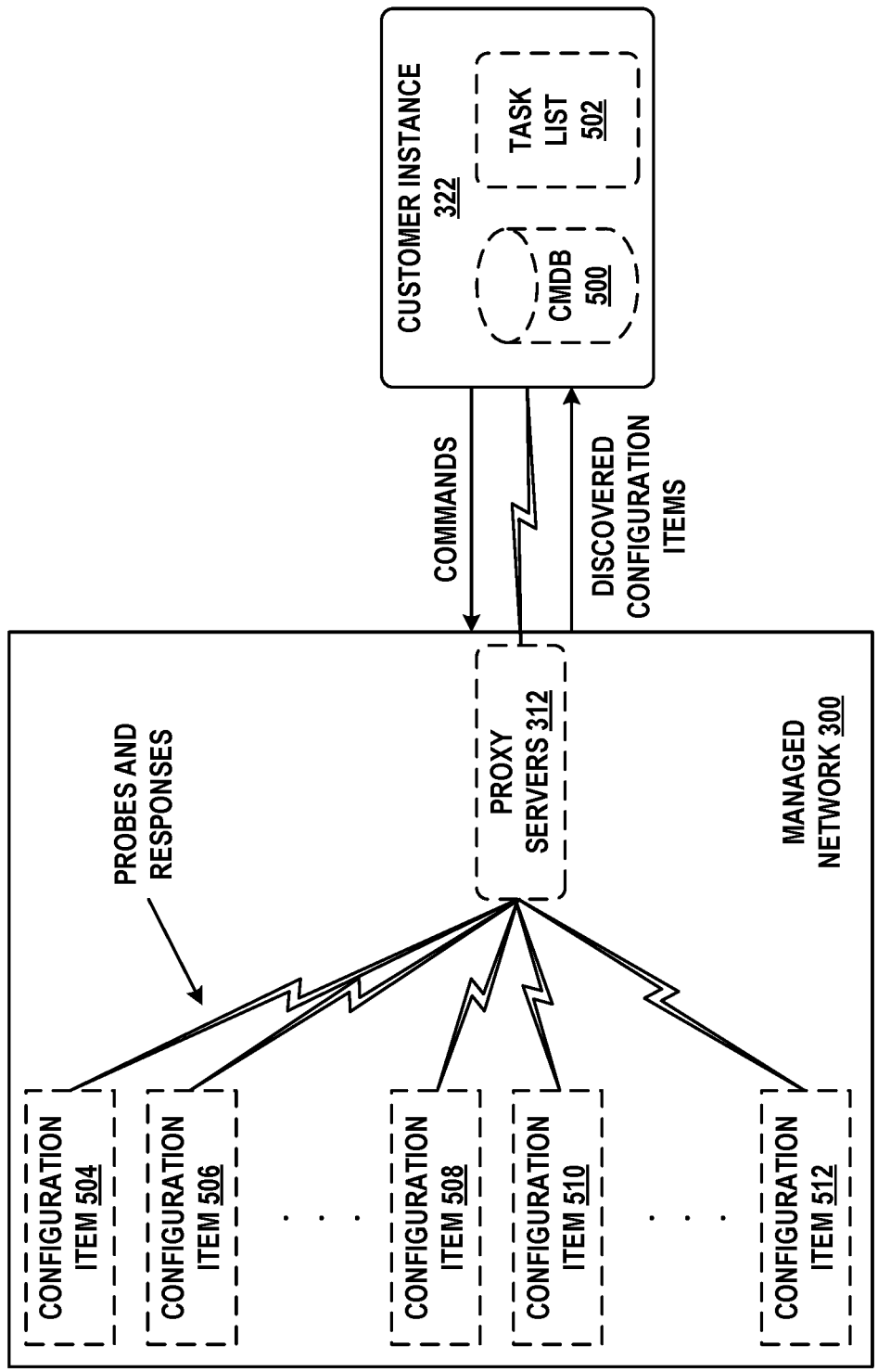
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices and services in managed network 300. These devices and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices and services in managed network 300 as configuration items 504, 506, 508, 510, and 512. As noted above, these configuration items represent a set of physical and/or virtual devices (e.g., client devices, server devices, routers, or virtual machines), services executing thereon (e.g., web servers, email servers, databases, or storage arrays), relationships therebetween, as well as higher-level services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (services), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
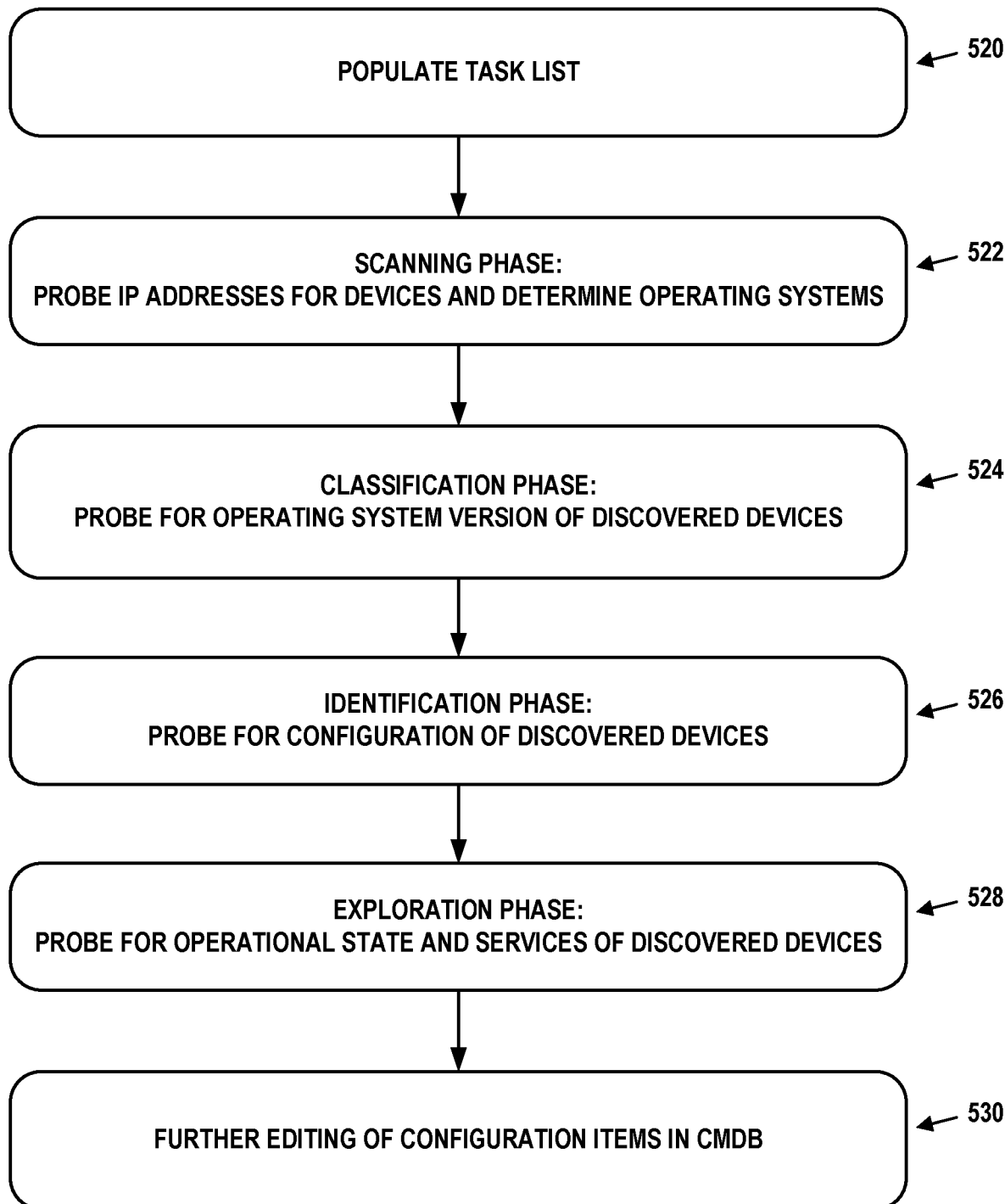
FIG. 5B is a flow chart of an example method, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and services executing on the discovered devices. At block 530, further editing of the configuration items representing the discovered devices and services may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE DYNAMIC MULTI-FACTOR RANKING FOR CUSTOMER SERVICE MANAGEMENT

One of the operational missions of network management in an enterprise network is customer support management, where a "customer" is taken to be person (e.g., an end user) accessing services, applications, and/or data of a managed network from an end-user station, such as a PC or other client device. In an example embodiment, customer service management (CSM) may be configured as part of the remote network management platform 320.

In the context of an enterprise network, including one that is part of a remotely managed network such as managed network 300, various types of end-users carrying out various types of activities and tasks may be considered "customers." For example, an online sales agent making end sales to external (from the enterprise) consumer-customers may be considered a customer of a sales-support system of the managed network. As another example, a consumer order fulfillment representative may be considered a customer of an inventory/supply chain management system of the managed network. Further, most or all employees of an enterprise may be considered customers of a network communications management system of the managed network. These are just a few non-limiting examples of who may be considered customers of a managed enterprise network. Other examples are possible as well.

During the course of their work activities at end-user stations or other access devices, any of these types of example customers, as well as a variety of others, may, from time to time, discover and/or be impacted by one or another problem somewhere in the managed network (possibly including at their end user stations). For instance, a sales person may not be able to reach a sales database from his/her end user station. Or an order fulfillment representative may not be able to reach an inventory server from his/her end user station. Or a consumer-customer service representative may be unable to send email from his/her end user station. In accordance with example embodiments, a remotely managed network system, such as remote network management platform 320, may provide network customers with means for reporting problems such as these examples, as well as any number of other types of problems, to a CSM system. In particular the CSM system may be configured for receiving problem reports from end user stations and delivering them to customer service personnel, who may then assess the problem reports and undertake actions to resolve the problems.

Thus, as problem reports are received by the CMS system, they may be distributed in some manner among one or more CSM personnel, referred to herein as "CSM representatives" or "CSM reps." In practice, a CSM rep may field problem reports at a CSM end-station monitoring device, where the reports may be displayed in a list or some other organized format. The CSM rep may then address the problem reports in some order. Because there can be multiple, different factors to consider in determining an order for responding to problem reports, one of the challenges involved in the process of problem evaluation and resolution is deciding what that order should be. Non-limiting examples of such factors that could be associated with each problem report may include a description and/or category of the reported problem, the customer who reported the problem, the consequence(s) that may result from the problem, and how long the problem has existed, among other possible factors. Further, the mix of factors and their relative importance may be different (or deemed so by a CSM rep) at different times and/or under different circumstances.

In accordance with example embodiments, the CSM system may apply multi-factor ranking in a dynamic manner to score and rank a plurality of problem reports, and thereby provide an intelligent and efficient priority order. More specifically, techniques of conventional multi-factor ranking have been adapted in accordance with example embodiments to enable dynamic selection of ranking factors associated with problem reports, as well as dynamic adjustment of analytical weighting, to be applied to a plurality of problem reports. In this way, the factors and weights used in computing a multi-factor ranking of the problem reports may be selected and/or modified according to circumstances and/or considerations observed and/or determined by a CSM rep (or other CSM personnel). Thus, the CSM rep can tune the priority ordering of problem reports to best match current needs and/or events. Correspondingly, the order in which problems get addressed and resolved may be optimized for overall system performance, specific target areas of performance, or forms or aspects of system performance goals.

In an example embodiment, dynamic multi-factor ranking makes use of a type of static multi-factor ranking conventionally applied in areas such as financial services, for example for ranking investment instruments, such as stocks or bonds. In this conventional use of multi-factor ranking, the factors and relative statistical weights applied are static in the sense that the selection or mix remains fixed, although the particular items being ranked (e.g., stocks or bonds) may vary. It is useful to consider a generalized description of multi-factor ranking in the conventional context in order to illustrate how it may be advantageously adapted in accordance with example embodiments for the dynamic environment of problem report ranking in a CSM system, where consideration of which factors to use must accommodate dynamic conditions of enterprise network management.

In the context of ranking N items $\{C_i\}$, i=1, . . . , N according to M factors $\{F_j\}$, j=1, . . . , M, a statistic referred to as a "Z-score" may be used. In mathematical terms, a Z-score $Z_{ij}$ for factor $F_{ij}$—that is factor j of item i—may be expressed generally as:

$$Z_{ij} = \frac{F_{ij} + \langle F_j \rangle}{S_j}, \qquad [1]$$

where $\langle F_j \rangle$ is a some form of statistical mean, median, expected value, or the like, of $F_{ij}$, and $\langle S_j \rangle$ is some form of statistical spread, or the like, about $\langle F_j \rangle$. Here, $\langle F_j \rangle$ and $\langle S_j \rangle$ are computed or determined for each factor over all the N items $\{C_i\}$. Precise definitions of $\langle F_j \rangle$ and $\langle S_j \rangle$ may depend on the form of statistical distribution that describes F; over all the items. For example, for a normal distribution, $\langle F_j \rangle$ could be an arithmetic mean (average) and $\langle S_j \rangle$ could then be the standard deviation about the mean. However, other definitions could apply of other types of distributions.

For each item, the Z-scores may be added in a weighted sum to yield an overall Z-score for that item. That is, a separate weight $w_j$ can be applied to each factor, where:

$$\Sigma_{j=1}^{M} |w_j| = 1. \qquad [2]$$

The overall Z-score $Z_i$ for item i can then be expressed as:

$$Z_i = \Sigma_{j=1}^{M} w_j Z_{ij}. \qquad [3]$$

An overall Z-score as expressed in equation [3] can thus be computed for each of the N items, and the N items then ranked according to their computed scores. In this formulation, the ranking factors $F_{ij}$ either have or are associated with numerical values. Further, the statistical distributions of the factors need not all be the same, either in mathematical form or in the specific values of the distribution parameters. In a conventional application of multi-factor ranking that employs the formulation of equations [1]-[3], the selection of factors and weights are taken to be fixed, while the values of $\langle F_j \rangle$ and $\langle S_j \rangle$ may vary depending on the specific items being ranked.

In accordance with example embodiments, multi-factor ranking can be made dynamic by recasting the ranking factors as dynamically selectable and their weights as dynamically adjustable. More specifically, each problem report in a managed network may have a multiplicity of possible factors for ranking. A CSM rep (or other problem-report responder) may receive a collection of the problem reports at a CSM end station device, for example as problem report messages, and may dynamically select which of ranking factors to include in a dynamic multi-factor ranking computation of a collection of problem reports. The CSM rep may also adjust weighting values used in the computation. The CSM rep may make the selection and adjustments based on a variety of objective and/or subjective criteria, such as time of day, known current or upcoming critical missions of the enterprise, and/or other immediate circumstances. These examples are not intended to be limiting. The collection of problem reports may thus be ranked according to the selected factors and weight adjustments determined by the CSM rep. The ranking may then be taken as a prioritization of the problem reports that determines or suggests the order in which the CSM rep addresses (or should address) the problems.

In an example embodiment, ranking factors for problem reports may be cast as "attributes" of the problem reports, such that each attribute identifies or defines a ranking factor and has an "attribute value" that is, or is associated with, a numerical value. Each problem report may have a multiplicity of attributes, any number of which may be dynamically selected for application in one or more dynamic multi-factor ranking computations. Thus, the computations use the numerical values associated with the selected attributes.

By way of example, the multiplicity of attributes may include: a problem category having an attribute value identifying a category code associated with a numerical value; a problem severity indicator having an attribute value assigning a severity code associated with a numerical value; a username having an attribute value associating a particular user (e.g., customer) with the problem report message, where particular users (or particular groups or classes of users) may be associated with numerical values for ranking; a reporting station indicator having an attribute value identifying a particular reporting station as a sender of the problem report message, where particular reporting stations (or particular groups of reporting stations) may be associated with numerical values for ranking; a time stamp having an attribute value of a time the problem report message was sent, where durations may be derived from time stamps and used as numerical ranking values; a repetition count having an attribute value indicative of how many times the same problem report message has been sent; and an unranked priority indicator having an attribute value assigning a priority independent of multi-factor ranking to the problem report message. These are just examples. Other attributes may be used.

Some of the attributes of a given problem report message may be set by the end user (customer) reporting the message. For example, the end user may set the problem category directly or by entering a problem description. Other attributes may be set automatically by the sending device (e.g., reporting station) and/or by a problem reporting application or program running on the reporting station. For example, the reporting station may include and reporting station identifier and the problem reporting program may automatically add a time stamp. Other attributes may be set by a CSM server that receives problem report messages. For example, the numerical values associated with the username and reporting station might be set at the CSM server based on a look-up. The CSM rep may also be able to set attributes.

In further accordance with example embodiments, an existing list or multiplicity of attributes may be expandable to include new attributes defined by a CSM rep, for example. This allows further customization of dynamic multi-factor ranking.

In accordance with example embodiments, CSM operations, including dynamic multi-factor ranking of problem reports, may be implemented in computing system that is part of a remote network management platform 320. The computing system may include one or more processors, memory, and program instructions that, when executed by the one or more processors, cause the computing system to carry out various operations and functions of dynamic multi-factor ranking of problem reports described herein.

Figure 6:
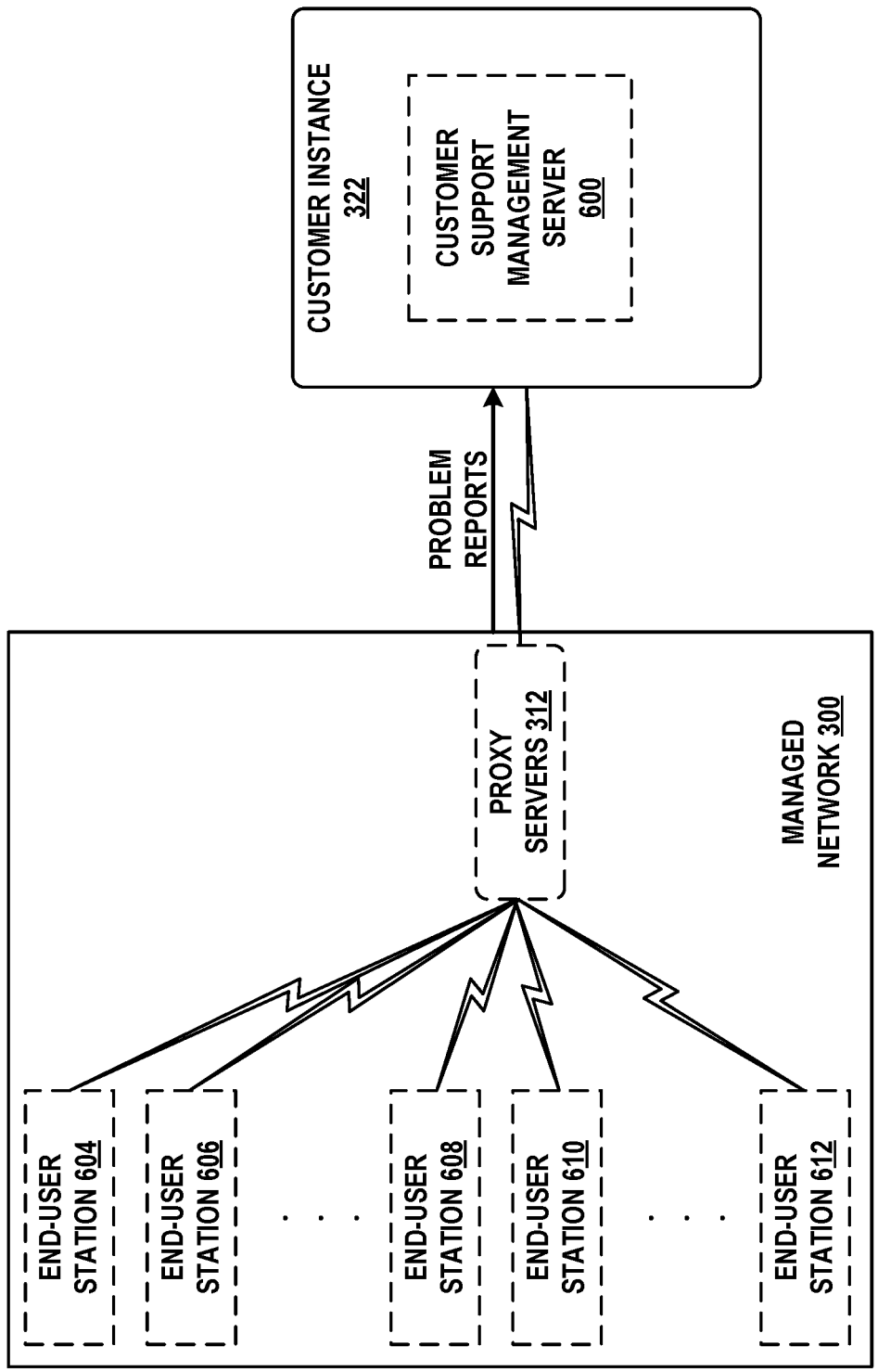
FIG. 6 depicts another communication environment involving a remote network management architecture, showing additional detail, in accordance with example embodiments.

In an example embodiment, the computing system that implements dynamic multi-factor ranking of problem reports may be part of a remote management server. This is illustrated in FIG. 6, in which a remote management server takes the form of a customer support management (CSM) server 600 within, or as part of, the customer instance 322. The CSM server may be configured to receive problem report messages from one or more end-user stations 604, 606, . . . , 608, 610, . . . , 612. An end-user station may be taken to be a client device, such as a PC or other access computer, used by an end user who is thereby a "customer" of the CSM system, and of any given CSM rep who happens to be the recipient of a problem report message sent by that end user. An end-user device that sends a problem report message is also referred to herein as a "reporting station."

In example operation, the customer support management server 600 could communicate with a proxy server 312, a router 306, or other intermediary device in the managed network 300 to receive problem report messages. The CSM server 600 may then deliver the problem report messages to one or more CSM reps according to some distribution scheme. More specifically, problem report messages may be delivered to one or more end station devices of the CSM system where one or more CSM reps then may apply dynamic multi-factor ranking to help determine an order for responding to the received problem report messages. Communications from CSM reps to reporting stations, such as a responses or queries, may be supported by the same communication paths (but in reverse) used for receiving problem report messages processing.

Figure 7:
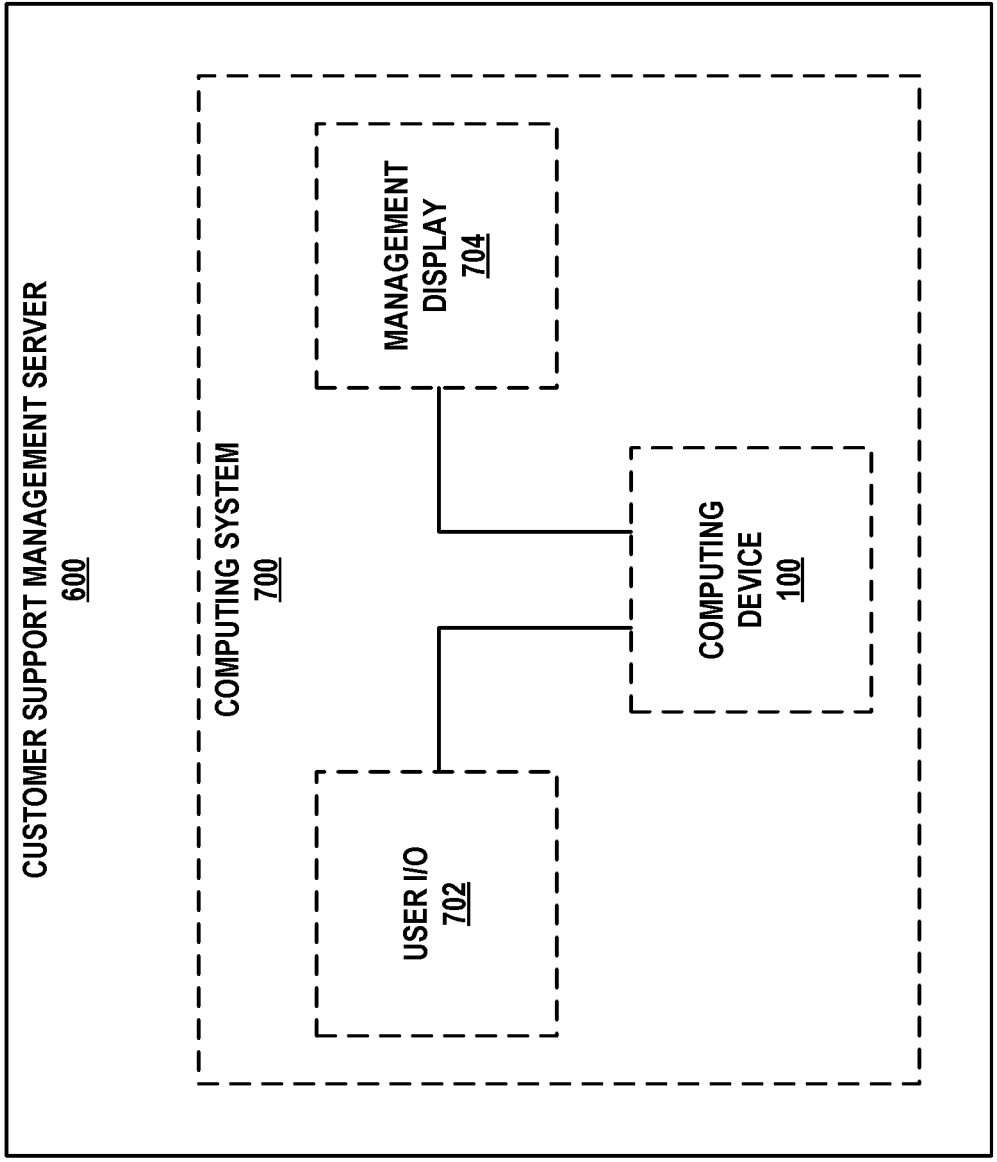
FIG. 7 depicts a customer support management server, in accordance with example embodiments.

FIG. 7 illustrates an example customer support management server 600, in accordance with example embodiments. The arrangement shown could also apply more generally to other implementations of a remote management server. As shown, the customer support management server 600 includes a computing system 700 that, in turn, includes a computing device 100, a user I/O interface 702, and a management display 704. The user I/O interface 702 may include a keyboard and mouse, as well as other devices enabling a user interact with the computing system 100. The management display 704 includes a display device for displaying problem report messages and dynamic factor selection, described below in more detail. While the management display 704 may be considered an output device, it is shown separately from the user I/O 702 to facilitated discussion of specific features and functions of dynamic multi-factor ranking, also discussed below.

Figure 8A:
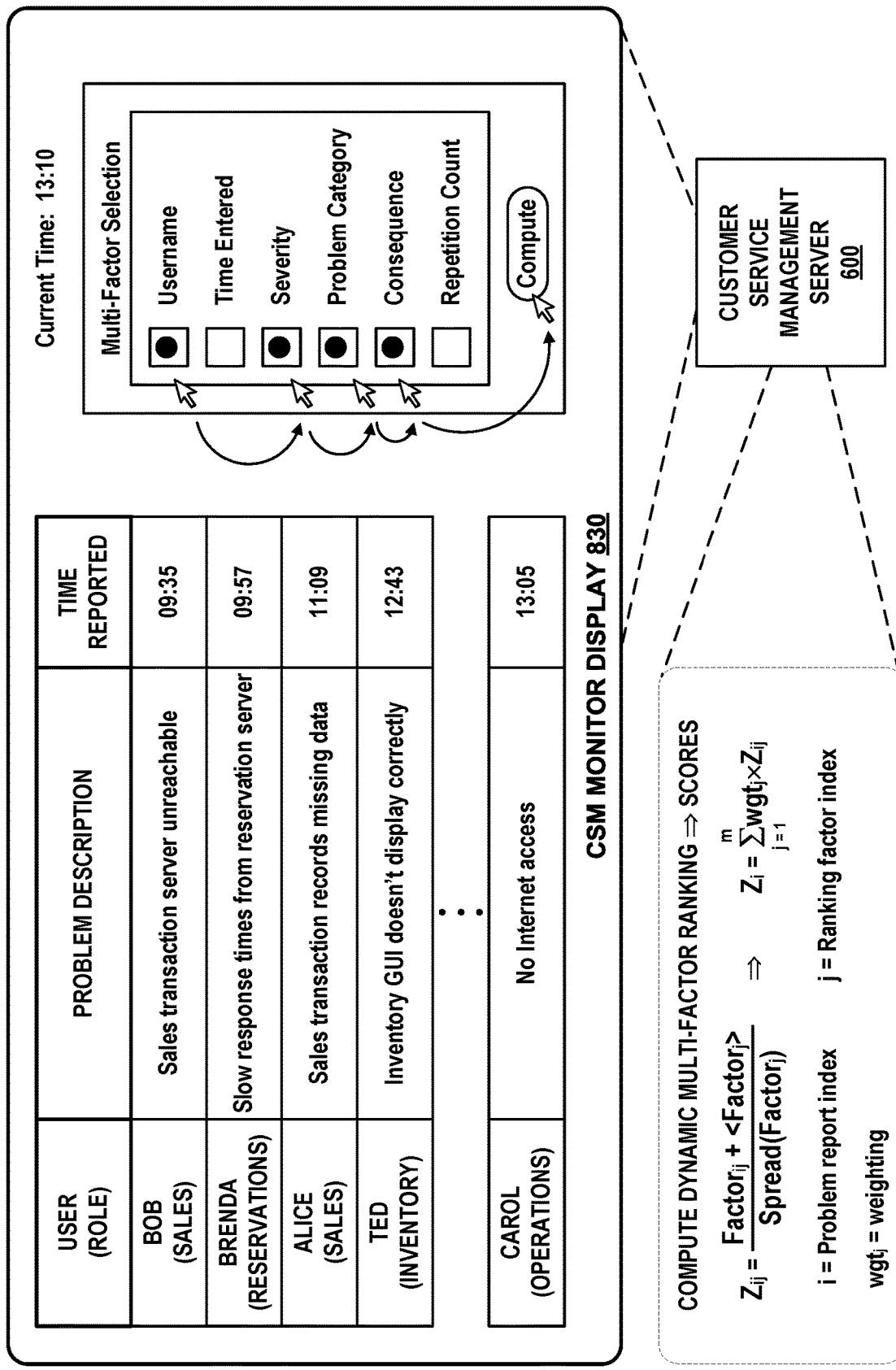
FIG. 8A illustrates an example display presentation of a customer support management server, as well as a conceptual representation of one aspect of dynamic multi-factor ranking, in accordance with example embodiments.
Figure 8B:
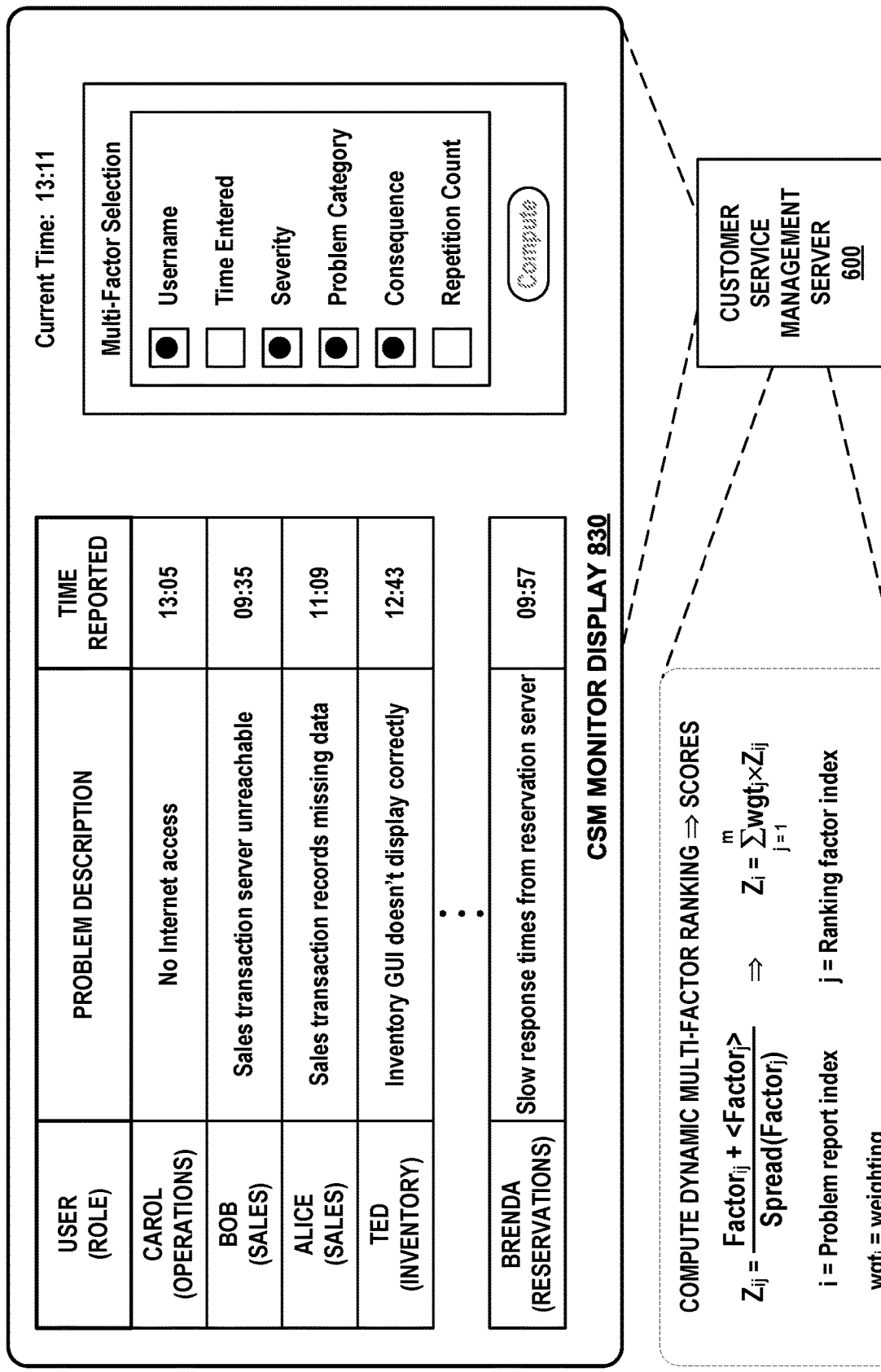
FIG. 8B illustrates an example display presentation of a customer support management server, as well as a conceptual representation of another aspect of dynamic multi-factor ranking, in accordance with example embodiments.

FIGS. 8A and 8B depicts further operational aspects an example embodiment of dynamic multi-factor ranking in a CSM system. Specifically, FIGS. 8A and 8B illustrate an example display presentation of a CSM system end station device, as well as a conceptual representation dynamic multi-factor ranking. The figures show a customer support management server 600 and an example CSM monitor display 830 showing snapshots of two example operational phases. For purposes of discussion, the CSM system may be taken to be part of a remote management system for an enterprise network. In each figure, a list of problem report messages is displayed on the left side of the CSM monitor display 830. By way of example, each problem report identifies the user who sent the report, with the user's role (e.g., job function) in the enterprise listed underneath. Each problem report also provides a problem description and a time stamp indicating when the problem was reported. It will be appreciated that other and/or different information associated with problem report messages could be displayed as well.

In FIG. 8A, the list represents problem reports delivered in the order in which they were received, as indicated by the time stamp shown for each problem report message. The particular problem report messages shown—i.e., the users and the reported problem descriptions and time stamps—are for illustration only. Thus, for the illustrated example, user Bob in sales has reported that a sales transaction server is unreachable; the problem was reported at 09:30 (9:30 AM). At 09:57, user Brenda in reservations reported slow response times from a reservation server. Three other example problem report messages are displayed, and the corresponding information is self-evident from FIG. 8A.

The right side of the CSM monitor display 830 displays a "Multi-Factor Selection" dialog box, with the current time list above. By way of example, the Multi-Factor Selection dialog box lists six ranking factors (e.g., attributes, as discussed above): username, time entered, severity, problem category, consequence, and repetition count. A separate "radio button" is displayed to the left of each ranking factor. An arrow cursor shown at a sequence of the six radio boxes represents selection of the associated ranking factors, as indicated by a black in each of the selected radio boxes; curved arrows trace the sequence of cursor selection operations. In the example illustrated, a CSM rep (for example) evidently dynamically selected username, severity, problem category, and consequence as ranking factors. After the selections were made, a "Compute" button at the bottom of the Multi-Factor Selection dialog box was clicked. This action signaled the CSM system to dynamically compute a multi-factor ranking for the listed problem report messages according to the dynamically selected ranking factors.

In accordance with example embodiments, the multi-factor ranking may then be determined by executing program instructions for implementing computations described by or similar to equations [1]-[3] above, for example. This is illustrated conceptually by dashed box below the CSM monitor display 830 indicating some of the analytical expressions discussed above.

FIG. 8B shows the list of problem report message re-ordered according to the dynamic multi-factor ranking computation carried out in response to the clicking (or other type of selection) of the Compute button. By way of example, the re-ordered list now gives highest ranking to Carol in operations, whose problem report was the last received (latest time stamp). The example re-ordering is not intended to reflect an actual calculation of dynamic multi-factor ranking, but rather represent a hypothetical re-ordering for purposes of illustration. Evidently, the re-ordering suggests that Brenda's problem should be addressed first. Note that the Compute button in FIG. 8B is grayed-out, indicating the computation based on the factor selection illustrated in FIG. 8A has been carried out.

The above example is just one illustration of how "before" and "after" phases of dynamic multi-factor ranking might appear on a monitor display used by a CSM rep, and what some aspects of a graphical user interface for dynamic multi-factor ranking might appear. It is not intended to be a complete representation of all aspects of user interaction with dynamic multi-factor ranking. For example, there could be additional and/or different dialog boxes for adjusting the weight values of the selected factors, and/or dialog boxes for expanding the list of possible factors. It will be appreciated that these and other possible features could be included in a user interface for dynamic multi-factor ranking.

VI. EXAMPLE OPERATIONS

Figure 9:
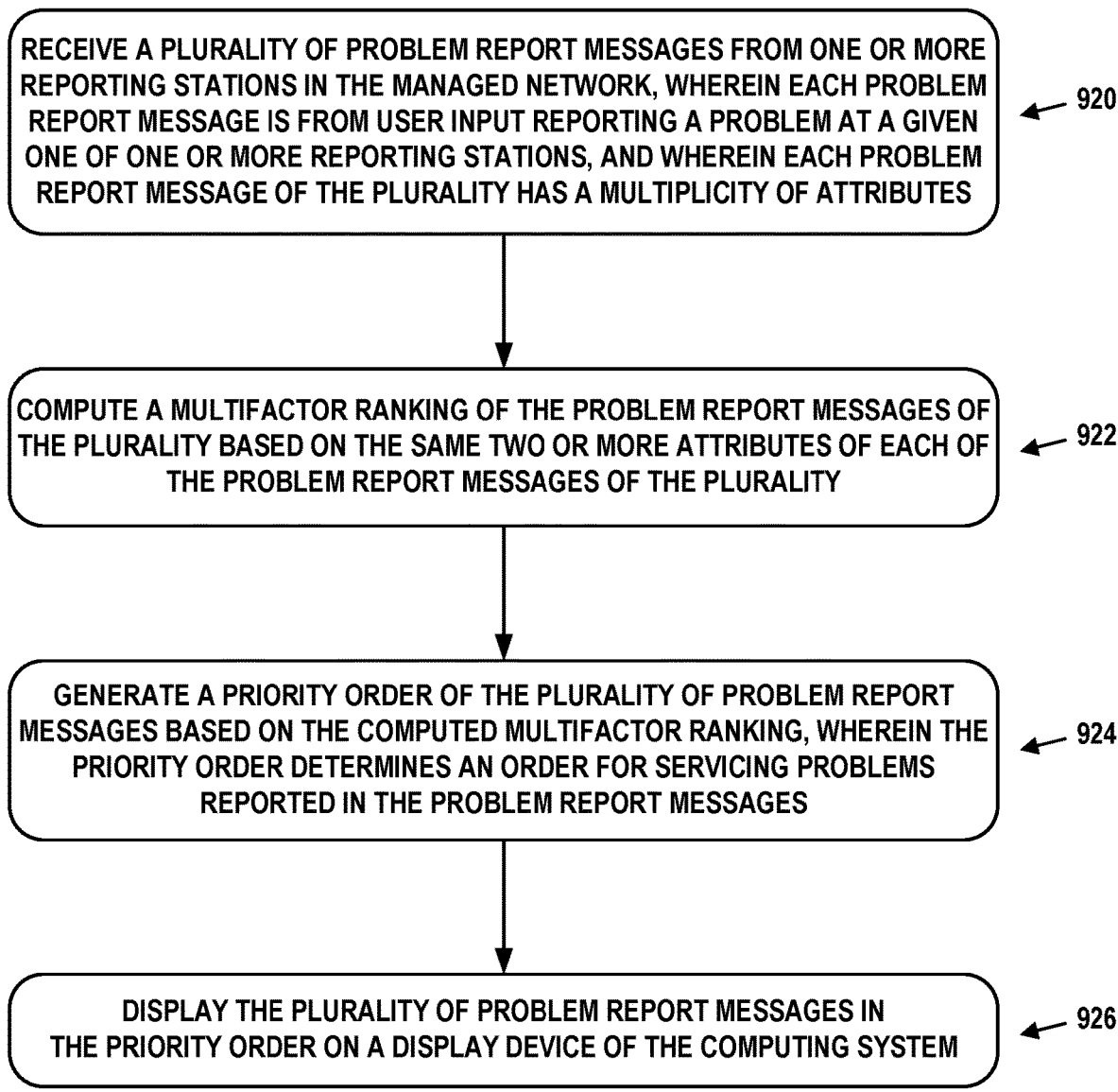
FIG. 9 is a flow chart of an example method of performance monitoring, in accordance with example embodiments.

FIG. 9 is a flow chart of an example method of dynamic multi-factor ranking for task prioritization, in accordance with example embodiments. The method illustrated by FIG. 9 may be carried out by a computing system disposed within a remote network management platform and configured to support customer support management in a managed network. Non-limiting examples of a computing system include the computing system 700 in the customer support management server 600 illustrated in FIG. 7, and more generally in computing device 100, and/or a cluster of computing devices, such as server cluster 200. However, the method can be carried out by other types of devices or device subsystems. For example, the process could be carried out by a portable computer, such as a laptop or a tablet device.

The example method may be implemented as machine language or other forms of computer-readable programmatic instructions stored in memory and accessible to one or more processors of the computing device or computing system that, when executed by one or more processors of the computing device or computing system, cause the computing device or computing system to carry out the various steps, functions, and/or operations described herein. The machine language or other forms of programmatic instructions may further be stored on tangible, non-transitory computer-readable medium for delivery to and loading in one or more computing systems for subsequent execution.

The embodiments of FIG. 9 may be simplified by the removal of any one or more of the features shown therein. Further, these embodiments may be combined with features, aspects, and/or implementations of any of the previous figures or otherwise described herein.

At block 920, the computing system may receive a plurality of problem report messages from one or more reporting stations in the managed network. Each problem report message of the plurality could be indicative of user input for reporting a problem at a given one of the one or more reporting stations, and each problem report message of the plurality may have a multiplicity of attributes.

At block 922, the computing system may compute a multi-factor ranking of the problem report messages of the plurality based on the same two or more attributes of each of the problem report messages of the plurality. That is, for each problem report message, the same two or more attributes are used in computing the multi-factor ranking.

At block 924, the computing system may generate a priority order of the plurality of problem report messages based on the computed multi-factor ranking. In particular, the priority order can be used as an order for servicing problems reported in the problem report messages. As such, the multi-factor ranking may be considered as prioritizing tasks, where the tasks entail servicing problems reported in problem report messages.

Finally, at block 926, the computing system may display the plurality of problem report messages in the priority order on a display device of the computing system. In doing so, the displayed problem report messages provide an order in which the associated problems may be addressed.

In accordance with example embodiments, the example method may further entail dynamically selecting a further attribute from among the multiplicity, where the further attribute is different from the two or more attributes. With the further attribute, the multi-factor ranking of the problem report messages may be re-computed based on the two or more attributes plus the further attribute of each of the problem report messages of the plurality, and the priority order of the plurality re-generated based on the re-computed multi-factor ranking. The plurality of problem report messages may then be re-displayed in the re-generated priority order on the display device. Note that a dynamic selection of attributes could be made as part of the operations block 922. That is, just before computing the multi-factor ranking, the attributes could be selected.

In accordance with example embodiments, each attribute of the multiplicity may have an attribute value, where each attribute value is a numerical value or has an associated numerical value. Then, computing the multi-factor ranking of the problem report messages of the plurality could entail determining for the two or more attributes of each given problem report message of the plurality the attribute values specific to the given problem report message, and computing the multi-factor ranking of the problem report messages of the plurality based on the determined attribute values specific to each of the problem report messages of the plurality.

In further accordance with example embodiments, each problem report message could include information indicative of a problem description. In an example, the multiplicity of attributes could include at least one of: a problem category having an attribute value identifying a category code; a problem severity indicator having an attribute value assigning a severity code; a username having an attribute value associating a particular user with the problem report message; a reporting station indicator having an attribute value identifying a particular reporting station as a sender of the problem report message; a time stamp having an attribute value of a time the problem report message was sent; a consequence indicator having an attribute value assigning a consequence code; a repetition count having an attribute value indicative of how many times the same problem report message has been sent; and an unranked priority indicator having an attribute value assigning a priority independent of multi-factor ranking to the problem report message.

In still further accordance with example embodiments, computing the multi-factor ranking of the problem report messages of the plurality based on the determined attribute values specific to each of the problem report messages of the plurality could entail computing an attribute Z-score for each of the two or more attributes of each given problem report message of the plurality based on the each attribute's value and on a statistical distribution of each attribute over the plurality of problem report messages, and computing an overall Z-score for each given problem report message based on a weighted sum of all of the attribute Z-scores for given problem report message using a defined set of numerical weighting factors. It will be appreciated that there are other analytical formulations for computing multi-factor ranking, and that the Z-score formalism is just one example.

In further accordance with example embodiments, generating the priority order of the plurality of problem report messages based on the computed multi-factor ranking could entail ordering the problem report messages according to their respective overall Z-scores. In this case, displaying the plurality of problem report messages in the priority order on the display device could then entail displaying the overall Z-score for each problem report message.

In still further accordance with example embodiments, the example method could further entail dynamically adjusting the defined set of numerical weighting factors prior to computing the overall Z-scores.

A. Other Variations and Embodiments

The example computing devices, platforms, network entities, and the like described above represent individually and/or collectively device means for carrying out the various operations, functions, and methods described herein. Similarly, the example methods described in connection with FIGS. 5B and 9 represent operational means, when made operational on one or more of the device means, for implementing the various example embodiments described herein.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system disposed within a remote network management platform and configured to support a managed network, the computing system comprising:
    a display device;
    one or more processors;
    memory; and
    program instructions, stored in the memory, that upon execution by the one or more processors cause the computing system to perform operations including:
        receiving a plurality of problem report messages from one or more reporting stations in the managed network, wherein each problem report message of the plurality of problem report messages is indicative of user input for reporting a problem at a given one of the one or more reporting stations, and wherein each problem report message of the plurality has a multiplicity of attributes;
        sorting the plurality of problem report messages based on a first attribute from the multiplicity of attributes;
        receiving, via a graphical user interface, a selection of a second attribute from among the multiplicity of attributes, wherein the second attribute is different from the first attribute;
        computing a multi-factor ranking of the plurality of problem report messages based on the first and second attributes of each of the plurality of problem report messages, wherein computing the multi-factor ranking of the plurality of problem report messages comprises:
            determining, for each of the first and second attributes of a given problem report message of the plurality of problem report messages, an attribute value specific to the problem report message;
            computing an attribute Z-score for each of the first and second attributes of the given problem report message based on the determined attribute value and on a statistical distribution of the multiplicity of attributes over the plurality of problem report messages; and
            computing an overall Z-score for the given problem report message from the plurality of problem report messages based on a weighted sum of all attribute Z-scores for the given problem report message using a defined set of numerical weighting factors;
        generating a priority order of the plurality of problem report messages based on the computed multi-factor ranking, wherein the priority order determines an order for servicing problems reported in the problem report messages; and
        displaying the plurality of problem report messages in the priority order on the display device.

2. The computing system of claim 1, wherein the operations include:
    receiving a selection of a third attribute from among the multiplicity of attributes, wherein the third attribute is different from the first and second attributes;
    re-computing the multi-factor ranking of the problem report messages of the plurality based on the first, second, and third attributes;
    re-generating the priority order of the plurality of problem report messages based on the re-computed multi-factor ranking; and
    re-displaying the plurality of problem report messages in the re-generated priority order on the display device.

3. The computing system of claim 1, wherein the attribute value is a numerical value or having an associated numerical value, and wherein computing the multi-factor ranking of the problem report messages of the plurality based on the first and second attributes of each of the problem report messages of the plurality comprises:
    computing the multi-factor ranking of the problem report messages of the plurality based on the determined attribute values specific to each of the problem report messages of the plurality.

4. The computing system of claim 3, wherein each problem report message includes information indicative of a problem description, and wherein the multiplicity of attributes includes at least one of:
    a problem category having an attribute value identifying a category code;
    a problem severity indicator having an attribute value assigning a severity code;
    a username having an attribute value associating a particular user with the problem report message;
    a reporting station indicator having an attribute value identifying a particular reporting station as a sender of the problem report message;
    a time stamp having an attribute value of a time the problem report message was sent;
    a consequence indicator having an attribute value assigning a consequence code;
    a repetition count having an attribute value indicative of how many times the same problem report message has been sent; and
    an unranked priority indicator having an attribute value assigning a priority independent of multi-factor ranking to the problem report message.

5. The computing system of claim 1, wherein generating the priority order of the plurality of problem report messages based on the computed multi-factor ranking comprises ordering the problem report messages according to their respective overall Z-scores; and
wherein displaying the plurality of problem report messages in the priority order on the display device comprises displaying the overall Z-score for each problem report message.

6. The computing system of claim 1, wherein the operations include dynamically adjusting the defined set of numerical weighting factors prior to computing the overall Z-scores.

7. The computing system of claim 1, wherein the first attribute is a time stamp associated with a respective problem report message of the plurality of problem report messages.

8. A computing system disposed within a remote network management platform and configured to support a managed network, the computing system comprising:
a display device;
one or more processors;
memory; and
program instructions, stored in the memory, that upon execution by the one or more processors cause the computing system to perform operations including:
receiving a plurality of problem report messages from one or more reporting stations in the managed network, wherein each problem report message of the plurality is indicative of user input for reporting a problem at a given one of the one or more reporting stations, and wherein each problem report message of the plurality has a multiplicity of attributes;
sorting the plurality of problem report messages based on a first attribute from the multiplicity of attributes;
receiving, via a graphical user interface, a selection of a second attribute from among the multiplicity of attributes, wherein the second attribute is different from the first attribute;
computing a multi-factor ranking of the plurality of problem report messages based on values of the first and second attributes specific to each of the problem report messages of the plurality, wherein computing the multi-factor ranking of the plurality of problem report messages comprises:
determining, for the first and second attributes of a given problem report message of the plurality of problem report messages, an attribute value specific to the problem report message;
computing an attribute Z-score for the first and second attributes of the given problem report message based on the determined attribute value and on a statistical distribution of the multiplicity of attributes over the plurality of problem report messages; and
computing an overall Z-score for the given problem report message from the plurality of problem report messages based on a weighted sum of all of the attribute Z-scores for the given problem report message using a defined set of numerical weighting factors;
generating a priority order of the plurality of problem report messages based on the computed multi-factor ranking, wherein the priority order determines an order for servicing problems reported in the problem report messages; and
displaying the plurality of problem report messages in the priority order on the display device.

9. The computing system of claim 8, wherein the attribute value is a numerical value or having an associated numerical value, and wherein computing the multi-factor ranking of the problem report messages of the plurality based on values of the first and second attributes specific to each of the problem report messages of the plurality comprises:
computing the multi-factor ranking of the problem report messages of the plurality based on the determined attribute values specific to each of the problem report messages of the plurality.

10. The computing system of claim 9, wherein each problem report message includes information indicative of a problem description, and wherein the multiplicity of attributes includes at least one of:
a problem category having an attribute value identifying a category code;
a problem severity indicator having an attribute value assigning a severity code;
a username having an attribute value associating a particular user with the problem report message;
a reporting station indicator having an attribute value identifying a particular reporting station as a sender of the problem report message;
a time stamp having an attribute value of a time the problem report message was sent;
a consequence indicator having an attribute value assigning a consequence code;
a repetition count having an attribute value indicative of how many times the same problem report message has been sent; and
an unranked priority indicator having an attribute value assigning a priority independent of multi-factor ranking to the problem report message.

11. The computing system of claim 9, wherein generating the priority order of the plurality of problem report messages based on the computed multi-factor ranking comprises ordering the problem report messages according to their respective overall Z-scores; and
wherein displaying the plurality of problem report messages in the priority order on the display device comprises displaying the overall Z-score for each problem report message.

12. The computing system of claim 9, wherein the operations include dynamically adjusting the defined set of numerical weighting factors prior to computing the overall Z-scores.

13. A computer-implemented method carried out by a computing system disposed within a remote network management platform and configured to support a managed network, the method comprising:
receiving by the computing system a plurality of problem report messages from one or more reporting stations in the managed network, wherein each problem report message of the plurality is indicative of user input for reporting a problem at a given one of the one or more reporting stations, and wherein each problem report message of the plurality has a multiplicity of attributes;
sorting the plurality of problem report messages based on a first attribute from the multiplicity of attributes;
receiving, via a graphical user interface, a selection of a second attribute from among the multiplicity of attributes, wherein the second attribute is different from the first attribute;
computing a multi-factor ranking of the plurality of problem report messages based on the first and second attributes of each of the problem report messages of the plurality, wherein computing the multi-factor ranking of the plurality of problem report messages comprises:

determining, for the first and second attributes of a given problem report message of the plurality of problem report messages, an attribute value specific to the problem report message;

computing an attribute Z-score for the first and second attributes of the problem report message based on the determined attribute value and on a statistical distribution of the multiplicity of attributes over the plurality of problem report messages; and computing an overall Z-score for the given problem report message from the plurality of problem report messages based on a weighted sum of all of the attribute Z-scores for the given problem report message using a defined set of numerical weighting factors;

generating a priority order of the plurality of problem report messages based on the computed multi-factor ranking, wherein the priority order determines an order for servicing problems reported in the problem report messages; and displaying the plurality of problem report messages in the priority order on a display device of the computing system.

14. The computer-implemented method of claim 13, comprising:

dynamically selecting a third attribute from among the multiplicity, the third attribute being different from the first and second attributes;

re-computing the multi-factor ranking of the problem report messages of the plurality based on the first, second, and third attributes;

re-generating the priority order of the plurality of problem report messages based on the re-computed multi-factor ranking; and re-displaying the plurality of problem report messages in the re-generated priority order on the display device.

15. The computer-implemented method of claim 13, wherein the attribute value is a numerical value or having an associated numerical value, and wherein computing the multi-factor ranking of the problem report messages of the plurality based on the first and second attributes of each of the problem report messages of the plurality comprises:

computing the multi-factor ranking of the problem report messages of the plurality based on the determined attribute values specific to each of the problem report messages of the plurality.

16. The computer-implemented method of claim 15, wherein each problem report message includes information indicative of a problem description, and wherein the multiplicity of attributes includes at least one of:

a problem category having an attribute value identifying a category code;

a problem severity indicator having an attribute value assigning a severity code;

a username having an attribute value associating a particular user with the problem report message;

a reporting station indicator having an attribute value identifying a particular reporting station as a sender of the problem report message;

a time stamp having an attribute value of a time the problem report message was sent;

a consequence indicator having an attribute value assigning a consequence code;

a repetition count having an attribute value indicative of how many times the same problem report message has been sent; and an unranked priority indicator having an attribute value assigning a priority independent of multi-factor ranking to the problem report message.

17. The computer-implemented method of claim 15, wherein generating the priority order of the plurality of problem report messages based on the computed multi-factor ranking comprises ordering the problem report messages according to their respective overall Z-scores; and wherein displaying the plurality of problem report messages in the priority order on the display device comprises displaying the overall Z-score for each problem report message.

* * * * *